United States Patent [19]

Sanroma

[11] 3,898,194

[45] Aug. 5, 1975

[54] FLAME-RETARDANT POLYAMIDES

[75] Inventor: Ulises Canellas Sanroma, Chesterfield, Va.

[73] Assignee: The Firestone Tire & Rubber Company, Akron, Ohio

[22] Filed: Jan. 22, 1973

[21] Appl. No.: 325,293

[52] U.S. Cl..... 260/45.75 B; 260/45.7 R; 260/37 N
[51] Int. Cl............................................. C08g 51/58
[58] Field of Search ....... 260/45.78 B, 45.7 R, 37 N

[56] References Cited
UNITED STATES PATENTS

| | | | |
|---|---|---|---|
| 2,028,715 | 1/1936 | Hanson | 260/45.7 |
| 2,216,835 | 10/1940 | Carothers | 260/33.8 |
| 3,418,267 | 12/1968 | Busse | 260/33.8 |
| 3,560,441 | 2/1971 | Schwarcz et al. | 260/45.75 |

*Primary Examiner*—V. P. Hoke

[57] ABSTRACT

Nylons, such as nylon 6 and nylon 6-10, for instance, are rendered self-extinguishing by adding hexabromobenzene and antimony trioxide, preferably in the ratio of about 2 per cent of hexabromobenzene and about 1.5 per cent of antimony trioxide of small particle size. The nylon products may be used as filaments or other extruded or otherwise molded products. They may be reinforced with filamentary material such as glass fibers.

5 Claims, 2 Drawing Figures

OXYGEN INDEX OF 15% GLASS FILLED NYLON 6 RESINS

○ $C_6H_2Br_4/Sb_2O_3$, 2/1 RATIO
△ $C_6Br_6/Sb_2O_3$, 2/1 RATIO

OXYGEN INDEX OF NON-REINFORCED NYLON 6 MOLDING RESINS

○ $C_6H_2Br_4/Sb_2O_3$, 2/1 RATIO
△ $C_6Br_6/Sb_2O_3$, 2/1 RATIO

FLAME-RETARDANT POLYAMIDES

This invention relates to nylons, such as nylon 6 (polycaprolactam) and nylon 6-10 (polyhexamethylene sebacamide), for instance, compounded with small amounts of hexabromobenzene and antimony trioxide. These polymers are self-extinguishing with retention of excellent mechanical properties. The treated nylons may be used as filaments or other extruded or otherwise molded products, and they may be fabricated by other procedures. They may be reinforced with filamentary material, such as glass fibers, etc.

Flammability tests were made according to ASTM-D-635 as well as the well-known procedure for determining the oxygen index values according to ASTM-D-2863-70, using ⅛ inch × ½ inch × 5 inch specimens. The procedure was first described in detail in "CANDLE-TYPE TEST FOR FLAMMABILITY OF POLYMERS," by Fenimore and Martin in MODERN PLASTICS, November, 1966. According to this article, a plastic was considered "self-extinguishing" if its oxygen index was about 27 or higher; and it was considered "Slow Burning" if the index was 20 to 27. Any plastic with an oxygen index below 27 was rated "burning."

Antimony trioxide reacts synergistically with hexabromobenzene in rendering the polyamides studied, flame resistant.

Nylon 6 itself is quite flame resistant. In some tests it may be rated as "self-extinguishing," particularly in certain forms. When reinforced with glass fibers, it is more flammable than when not reinforced.

Various tests made with Nylon 6 compositions containing 1 to 16 per cent of hexabromobenzene (and usually no more than 8 per cent) and 0.5 to 8.0 per cent of antimony trioxide of 1 to 10 microns in the largest dimension, show such compositions to be less flammable than the unmodified polyamides and difficult to ignite. The preferred additive composition is 2.0 to 4.0 per cent hexabromobenzene and 1.0 to 2.0 per cent of antimony trioxide of approximately 2 to 2.5 microns in the largest dimension. Molded products of such compositions exhibited excellent physical properties, particularly with respect to elongation and tensile strength.

All known flame-retardant additives reduce the tensile strength and elongation somewhat. Generally, excess hexabromobenzene reduces tensile strength, while excess antimony trioxide is responsible for a drop in elongation at break, especially when particles of less than 1 micron particle size are used. Antimony trioxide alone gives a brittle resin and over 5 or 6 or 8 per cent of antimony trioxide with hexabromobenzene gives a brittle resin. Generally it is desirable to use about twice as much hexabromobenzene, by weight as antimony trioxide and 1 to 16 per cent of hexabromobenzene will be used with 0.5 to 8 per cent of antimony trioxide, the percentages being percentages by weight, based on the weight of the nylon. Preferably about 2 per cent by weight of hexabromobenzene is used with about 1.5 per cent by weight of antimony trioxide, based on the weight of the nylon. It was found that an excess of additives accelerates the degradation of the polymer close to the flame and causes dripping which results in poor performance as per test ASTM-D-635. It was found that fine mesh screen, e.g. 150 to 325 mesh, in the head of the extruder used in preparing these polymer compositions, although not necessary, breaks up agglomerates and gives an improved product in terms of mechanical properties.

The following composition is suggestive of a very satisfactory formulation for the preparation of the molding resins:

| | | |
|---|---|---|
| Nylon 6 | 96.5 | parts by weight |
| Hexabromobenzene | 2 | parts by weight |
| $Sb_2O_3$ (Thermoguard L) | 1.5 | parts by weight |

Antimony trioxide (Thermoguard L, for instance) composed of particles with an average diameter of 2.12 microns gives a nylon with better elongation than particles of antimony trioxide (Thermoguard W, for instance) composed of particles measuring less than 1 micron in diameter. Molded products prepared from the foregoing composition displayed good physical properties particularly with respect to tensile strength and elongation.

Nylon 6 without a flame-retardant additive had an oxygen index of 24 to 27 which indicates that at best it can be rated as just barely self-extinguishing. Any mixture of 0.5 to 8 per cent of antimony trioxide and 1.0 to 16 per cent of hexabromobenzene renders nylon 6 and 6-10 more flame resistant; the preferred synergistic mixture, which is 1 to 2 per cent of fine-particle-size antimony trioxide and 2 to 4 per cent of hexabromobenzene, gives an oxygen index value of over 30.

Comparative results of the use of antimony trioxide with hexabromobenzene and tetrabromobenzene using ⅛-inch specimens under the severe conditions of ASTM-D-635 are shown in the drawings, in which.

Figure 1:
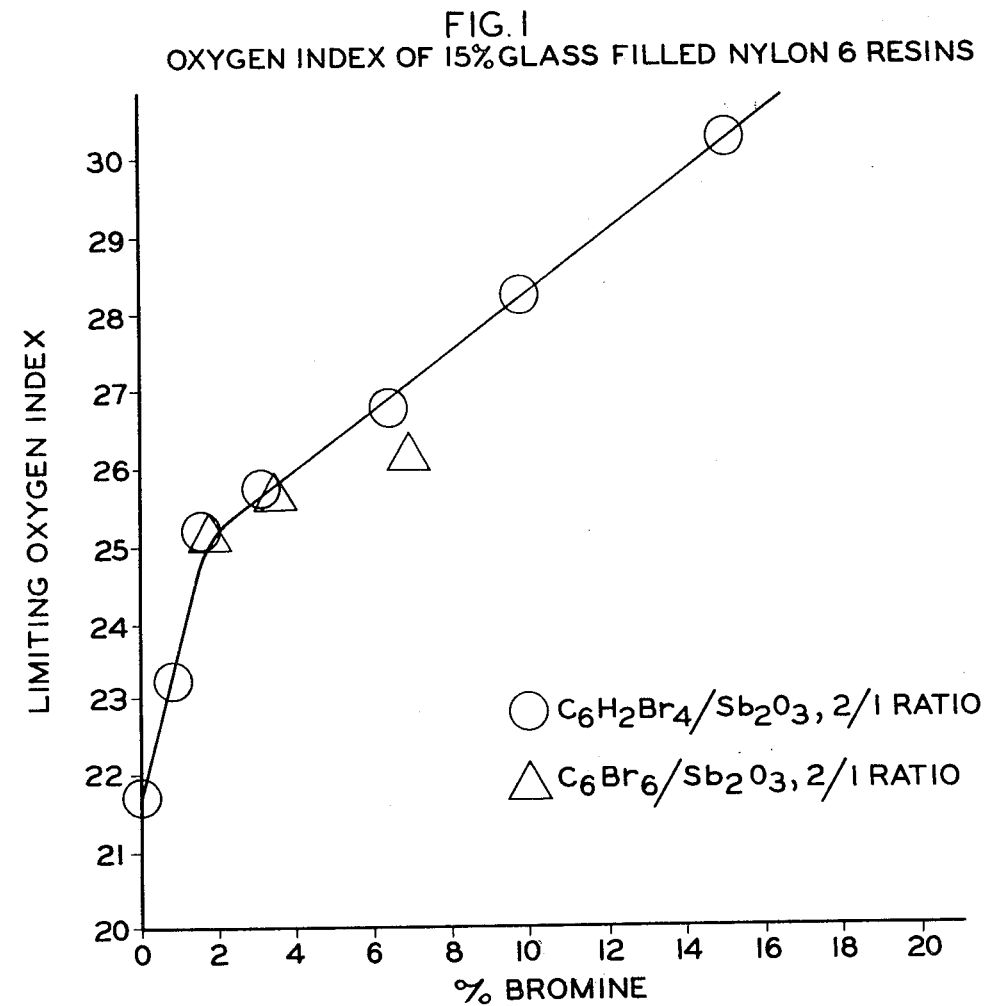
FIG. 1 shows the LIMITING OXYGEN INDEX for various nylon 6 resins reinforced with glass fibers, as shown. The results indicate that although some specimens would be rated as self-extinguishing, others would not.
Figure 2:
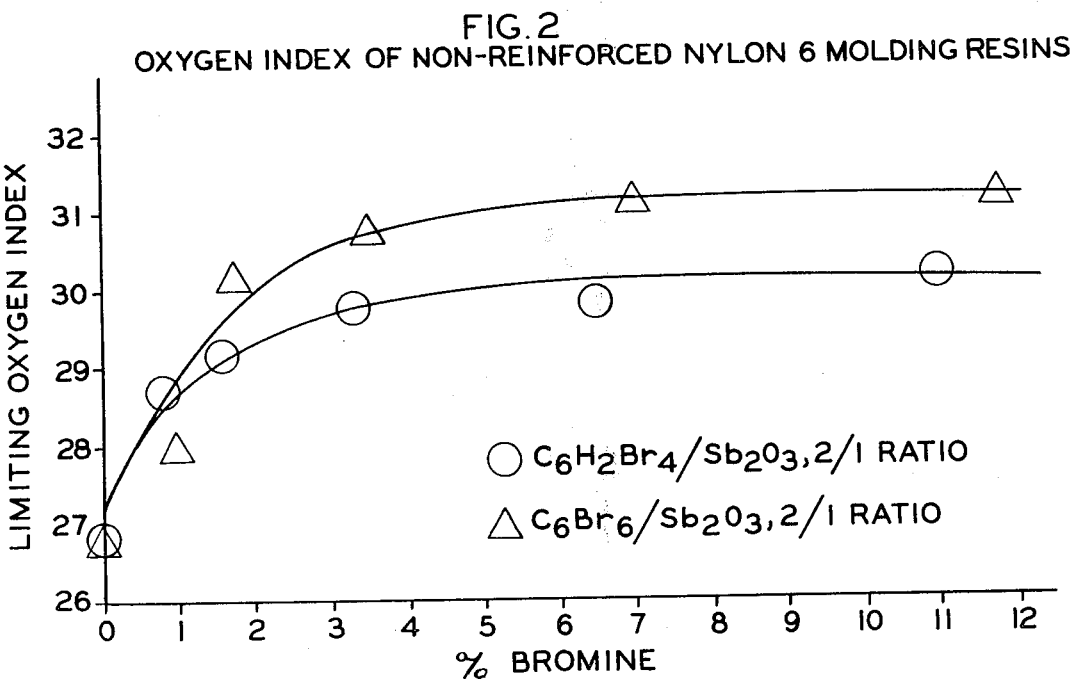
FIG. 2 shows the LIMITING OXYGEN INDEX for various non-reinforced nylon 6 specimens.

It was observed during the flammability testing recorded in FIG. 2, that more dripping occurred with the specimens containing tetrabromobenzene than with those containing hexabromobenzene. In the tests on glass-reinforced specimens, there was no dripping, and the results obtained with samples containing the different bromobenzenes were substantially equivalent.

In selecting the preferred mixture, the effect of additive levels on the physical properties of nylon 6 and 6-10, and particularly on their elongation were considered. The results of certain tests follow.

EXAMPLE 1

The comparative tests recorded in Table I were obtained before the compounding of 1.5 parts of fine-particle-size antimony trioxide and 2 per cent of hexabromobenzene had been selected as preferred. The data indicate that higher elongations are achieved using antimony trioxide with average particle size of approximately 2 to 2.5 microns (e.g. Thermoguard L). Neither the antimony trioxide nor the hexabromobenzene, alone, had as high an oxygen index as the use of the two together.

TABLE I

| SAMPLE NO. | $Sb_2O_3$ PARTICLES W | L | $C_6Br_6$ | TENSILE STRENGTH* psi | ELONGA- TION* % | IMPACT STRENGTH IZOD** ft.lb./inch | FLAMMABILITY*** |
|---|---|---|---|---|---|---|---|
| Control | 0 | 0 | 0 | 10,600 | 100 | 1.24 | B$^a$ |
| 1 | 1% | — | — | 11,100 | 30 | 1.09 | B$^a$ |
| 2 | — | — | 2% | 10,500 | 78 | 1.21 | B$^a$ |
| 3 | 1% | — | 2% | 11,600 | 35 | 1.06 | SE$^b$ |
| 4 | — | 1% | 2% | 11,250 | 57 | 1.15 | SE$^b$ |

*ASTM-D-638
**ASTM-D-790
***ASTM-D-635
$^a$ Burning
$^b$ Self-Extinguishing

The addition of the flame-retardant compounds had minimal deleterious effect on the tensile strength and elongation of the resulting moldings. In the flammability tests, "B" stands for Burning and "SE" stands for Self-Extinguishing. Samples 3 and 4 (Table I) were found to be self-extinguishing, while retaining both good tensile strength and elongation. The antimony trioxide of more than 2 microns particle size is shown to be preferred.

EXAMPLE 2

The results recorded in Table II were obtained with stocks compounded with hexabromobenzene and antimony trioxide passed through head screens of the mesh cited. The results show that by breaking up agglomerates, products of better physical properties were produced and brittle breaks were minimized.

TABLE II

| | SAMPLE NO. 1 | SAMPLE NO. 2 |
|---|---|---|
| $C_6Br_6$ | 2% | 2% |
| $Sb_2O_3$ | 1.50 | 1.50 |
| Mesh of Filtering Screen | 150 | 325 |
| Elongation* % | 21-6 (8) | Avg. 32.5 (0) |
| Impact Strength, Izod** (ft.lb./inch) | 1.16 | 1.39 |
| Tensile Strength, psi*** | 10,200 | 10,465 |

*Indicates number of brittle breaks.
**ASTM-D-790
***ASTM-D-638

EXAMPLE 3

Specimens to which Tables III and IIIa refer, were prepared by molding blends prepared from virgin nylon 6 polymer and nylon 6 based concentrates containing hexabromobenzene and antimony trioxide (Thermoguard L). The results show that in order to minimize flammability, as measured by ASTM-D-2863-70, the concentration of hexabromobenzene must be kept in the range of 1 to 8 per cent. Little is gained by increasing the concentration of hexabromobenzene above 8 per cent. The results also show that the synergistic combination of hexabromobenzene and antimony trioxide is best achieved with the hexabromobenzene:antimony trioxide in a weight ratio between 1:1 and 2:1.

TABLE III

| $C_6Br_6$ | $Sb_2O_3$ THERMOGUARD L | OXYGEN INDEX* |
|---|---|---|
| 0.0% | 0.0% | 26.7 |
| 1.0% | 0.5% | 27.7 |
| 2.0% | 1.0% | 30.2 |
| 4.0% | 2.0% | 30.7 |
| 8.0% | 4.0% | 31.2 |
| 13.3% | 6.6% | 31.2 |

*ASTM-D-2863-70.

TABLE IIIa

| $C_6Br_6/Sb_2O_3$ WEIGHT RATIO | $C_6Br_6$ % | $Sb_2O_3$ % | OXYGEN INDEX* |
|---|---|---|---|
| 2:0 | 2 | 0 | 28.2 |
| 2:1 | 2 | 1 | 30.2 |
| 1:1 | 2 | 2 | 29.2 |

*ASTM-D-2863-70.

EXAMPLE 4

A flame-retarded nylon 6-10, polyhexamethylene sebacamide, resin was prepared by extruder compounding the base polymer with 2 per cent hexabromobenzene and 1.5 per cent antimony trioxide (Thermoguard L), and tests on this are recorded in Table IV. The molded resins were found to be self-extinguishing as per ASTM-D-635 and to have a high oxygen index as measured by ASTM-D-2863-70.

TABLE IV

| NYLON 6-10 | $C_6Br_6$ | $Sb_2O_3$ | ASTM-D-635 | ASTM-D-2863-70 |
|---|---|---|---|---|
| 100% | — | — | B* | 26.5 |
| 96.5% | 2% | 1.5% | SE** | 31.5 |

*Burning.
**Self-Extinguishing.

I claim:
1. A polyamide selected from the class consisting of poly(caprolactam) and poly(hexamethylene sebacamide) which polyamide contains, as a flame retardant, 1 to 16 per cent of hexabromobenzene and 0.5 to 8 per cent of antimony trioxide, particles of the latter measuring 1 to 10 microns in size.
2. The composition of claim 1 in which the weight of hexabromobenzene used is substantially twice the weight of antimony trioxide.
3. The composition of claim 1 which contains 1 to 2 per cent of hexabromobenzene and 2 to 4 per cent of antimony trioxide, the particles of the latter measuring approximately 2 to 2.5 microns average diameter.
4. A polyamide of claim 1 which contains 2 per cent of hexabromobenzene and 1.5 per cent of antimony trioxide.
5. The method of preparing the polyamide composition of claim 1 which comprises supplying the composition through a 150-mesh to 325-mesh screen to break up agglomerates.

* * * * *

UNITED STATES PATENT OFFICE

CERTIFICATE OF CORRECTION

Patent No. 3,898,194     Dated August 5, 1975

Inventor(s) Ulises Canellas Sanroma

It is certified that error appears in the above-identified patent and that said Letters Patent are hereby corrected as shown below:

Column 3, line 42, in Table II Under Sample No. 1 heading the last amount for Tensile Strength, psi*** reads as "10,200" It should be corrected to be -- 10,220 --

Signed and Sealed this twenty-first Day of October 1975

[SEAL]

Attest:

RUTH C. MASON
Attesting Officer

C. MARSHALL DANN
Commissioner of Patents and Trademarks